US012273677B2

(12) United States Patent
Wang et al.

(10) Patent No.: US 12,273,677 B2
(45) Date of Patent: Apr. 8, 2025

(54) WIRELESS LISTENING DEVICE

(71) Applicant: Listening Wisdom (Nanjing) Technology Co., Ltd., Jiangsu (CN)

(72) Inventors: Yingwei Wang, Nanjing (CN); Chunhong Yu, Nanjing (CN)

(73) Assignee: Listening Wisdom (Nanjing) Technology Co., Ltd., Nanjing (CN)

( * ) Notice: Subject to any disclaimer, the term of this patent is extended or adjusted under 35 U.S.C. 154(b) by 281 days.

(21) Appl. No.: 18/175,744

(22) Filed: Feb. 28, 2023

(65) Prior Publication Data

US 2023/0276164 A1 Aug. 31, 2023

(30) Foreign Application Priority Data

Feb. 28, 2022 (CN) ......................... 202220420246.4
Feb. 28, 2022 (CN) ......................... 202220420876.1

(51) Int. Cl.

| | |
|---|---|
| ***H04R 1/10*** | (2006.01) |
| ***H04R 1/40*** | (2006.01) |
| ***H04R 3/00*** | (2006.01) |

(52) U.S. Cl.

CPC ......... *H04R 1/1075* (2013.01); *H04R 1/1016* (2013.01); *H04R 1/1025* (2013.01); (Continued)

(58) Field of Classification Search

CPC ... H04R 1/1075; H04R 1/1025; H04R 1/1041
See application file for complete search history.

(56) References Cited

U.S. PATENT DOCUMENTS

2002/0106100 A1 8/2002 Kao et al.
2018/0376263 A1* 12/2018 Singer .................... H04R 25/60
(Continued)

FOREIGN PATENT DOCUMENTS

WO 2021015998 A1 1/2021
WO 2021095694 A1 5/2021

OTHER PUBLICATIONS

Communication from European Patent Office with Search Report of EP Patent Application No. 23157704.0, dated Jul. 4, 2023.
(Continued)

*Primary Examiner* — Simon King
(74) *Attorney, Agent, or Firm* — Cherskov Flaynik & Gurda, LLC

(57) ABSTRACT

The present disclosure relates to a wireless listening device, which includes a housing adapted to be wearable and a top cover. The top cover closes the housing at an end of the device and is provided with a central bumped portion that includes: a substantially planar panel portion; and a raised portion, which is connected around an outer periphery of the panel portion and at least partially extends toward the housing in a direction perpendicular to a plane where the panel portion is located. The panel portion and the raised portion form an accommodating groove that at least partially accommodate a charging device, a manipulation device and an antenna. In the plane where the panel portion is located, a diameter of a minimum circumscribed circle of orthographic projections of the charging device, the manipulation device, and the antenna as a whole is in a range of 8 to 16 mm.

15 Claims, 14 Drawing Sheets

(52) U.S. Cl.
CPC ........... *H04R 1/1041* (2013.01); *H04R 1/406* (2013.01); *H04R 3/005* (2013.01); *H04R 1/1083* (2013.01); *H04R 2201/107* (2013.01); *H04R 2410/01* (2013.01); *H04R 2460/11* (2013.01)

(56) References Cited

U.S. PATENT DOCUMENTS

| | | | | |
|---|---|---|---|---|
| 2020/0068283 | A1 * | 2/2020 | Chou | H04R 1/1025 |
| 2021/0185453 | A1 | 6/2021 | Nielsen et al. | |
| 2022/0369017 | A1 * | 11/2022 | Tanaka | H04R 1/1016 |
| 2023/0039552 | A1 * | 2/2023 | Huang | H04R 19/005 |

OTHER PUBLICATIONS

Dev Narayan, Examination Report of Indian Patent Application No. 202324010457, dated Mar. 11, 2024, Kolkata, India.
Communication from European Patent Office with Search Report of EP Patent Application No. 23157704.0, dated Nov. 7, 2023.

* cited by examiner

WIRELESS LISTENING DEVICE

This application claims priority to Chinese Patent Application No. 202220420246.4 filed on Feb. 28, 2022, issued as Chinese Utility Model Patent No. 202220420246.4 on Jul. 19, 2022, and Chinese Patent Application No. 202220420876.1 filed on Feb. 28, 2022, issued as Chinese Utility Model Patent No. 202220420876.1 on Jul. 19, 2022, both of which are incorporated herein by reference in their entirety.

TECHNICAL FIELD

The present disclosure relates to a wireless listening device.

BACKGROUND

With the development of science and technology, people's use habits for digital products change and the entertainment culture consumption level is improved, and people are increasingly dependent on the in-ear wireless listening device. To meet various functional requirements of the in-ear wireless listening device, the wireless listening device is correspondingly integrated with a large number of electronic components. However, in the current wireless listening device, most electronic components are centrally arranged in an area of the wireless listening device located outside the acoustic meatus of the user, and the layout is not compact enough. In this case, the outer end of the wireless listening device has a large volume and weight, and the wireless listening device cannot be stably supported at the user's ear, so on the one hand the wireless listening device is prone to fall off the user's ear, and on the other hand, the user's ear is prone to being stressed and painful when the wireless listening device is worn for a long time. Particularly, when the wireless listening device is operated, since the user's finger additionally applies a force onto the wireless listening device, it is easy to cause the wireless listening device to fall or aggravate the compression on the user's ear, which results in pain.

In addition, particularly in an in-ear wireless listening device integrated with a call noise reduction function, a dual-microphone noise reduction algorithm can be adopted for implementation. Here, many electronic components including two microphones need to be arranged in an area of the wireless listening device away from the acoustic meatus of the user. However, according to the principle of the dual-microphone noise reduction algorithm, it is necessary to use one of the two microphones to pick up the noise signals and the other to pick up both the noise signal and the voice signal, and the two microphones disposed separately can receive sounds with different frequencies and intensity distributions, so that the noise can be suppressed or eliminated using the difference in these signals. In this case, if the distance between the two microphones is too small, the frequencies and the intensity distributions of the sounds received by them are highly similar, which will filter or weaken the user's voice, resulting in poor call quality. But if the two microphones are arranged at a large distance, the wireless listening device will have a large volume, particularly at the outer end.

SUMMARY

An objective of the present disclosure is to provide a wireless listening device that is compact in structure, small in size, easy to manipulate, and not easy to fall off.

To achieve the above objective, the present disclosure provides a wireless listening device, comprising:

a housing, which is placeable at an external auditory canal and an auricular concha cavity of a wearer, and a top cover, which closes the housing at an end of the wireless listening device and is configured with a central bumped portion that comprises:

a panel portion, which extends substantially in a planar shape, and a raised portion, which is connected around an outer periphery of the panel portion and at least partially extends toward the housing in a direction perpendicular to a plane where the panel portion is located, wherein the panel portion and the raised portion form an accommodating groove opened toward an interior of the wireless listening device, and a charging device, a manipulation device and an antenna of the wireless listening device are at least partially accommodated in the accommodating groove, wherein in the plane where the panel portion is located, a diameter D of a minimum circumscribed circle of orthographic projections of the charging device, the manipulation device, and the antenna as a whole is in a range of 8 mm to 16 mm.

In some embodiments, in the plane where the panel portion is located, the diameter D of the minimum circumscribed circle of the orthographic projections of the charging device, the manipulation device, and the antenna as a whole is in a range of 10 mm to 14 mm.

In some embodiments, in the plane where the panel portion is located, the diameter D of the minimum circumscribed circle of the orthographic projections of the charging device, the manipulation device, and the antenna as a whole is in a range of 11 mm to 13 mm.

In some embodiments, the panel portion is substantially circular, elliptical, or polygonal.

In some embodiments, the manipulation device is configured as a touch pad.

In some embodiments, the charging device comprises a charging pin, and the panel portion is configured with a through-hole allowing the charging pin to extend through.

In some embodiments, in a plane perpendicular to the panel portion, an orthographic projection of the touchpad partially overlaps an orthographic projection of the charging pin.

In some embodiments, in the plane where the panel portion is located, a minimum circumscribed circle of the orthographic projection of the charging pin at least partially overlaps the orthographic projection of the touchpad.

In some embodiments, the antenna is arranged at a sidewall of the accommodating groove.

In some embodiments, the antenna is configured as a metal circuit formed on a sidewall of the accommodating groove or configured as a metal sheet extending along the sidewall of the accommodating groove.

In some embodiments, the top cover further comprises at least one lug portion, which is arranged at an outer periphery of the central bumped portion and forms a groove opened toward the interior of the wireless listening device.

In some embodiments, in the plane where the panel portion is located, a maximum distance L between an outer contour of an orthographic projection of the lug portion and a center of the minimum circumscribed circle is in a range of 8 mm to 12 mm.

In some embodiments, the cover plate is further configured with a joint portion, which is connected to an end of the raised portion opposite to the panel portion and at least partially extends toward the housing in a plane parallel to the panel portion.

In some embodiments, in a direction perpendicular to the panel portion, a distance $H_1$ between an outer surface of the panel portion and a connecting portion of the raised portion and the joint portion is 1 mm to 3 mm.

In some embodiments, the housing is configured with a contraction portion, which is formed at an edge of an accommodating cavity of the housing and at least partially extends toward the raised portion in a plane parallel to the panel portion.

In some embodiments, in a direction perpendicular to the panel portion, a distance $H_2$ between an outer surface of the panel portion and a connecting portion of the raised portion and the contraction portion is 1 mm to 3 mm.

In some embodiments, the housing is a housing customized according to an ear of the wearer, wherein an outer contour of the housing is at least partially matched with shapes of an external acoustic meatus and an auricular concha cavity of the wearer.

In some embodiments, the wireless listening device is configured with a ventilation duct for communicating the external acoustic meatus of the wearer with the outside.

In some embodiments, the wireless listening device is a wireless earphone.

In some embodiments, the wireless listening device comprises:

- a manipulation device, which is substantially in a flat plate shape;
- a charging device comprising a charging pin;
- a first microphone comprising a first sound pickup hole; and
- a second microphone comprising a second sound pickup hole,
- wherein in a plane perpendicular to the manipulation device, an orthographic projection of the manipulation device partially overlaps an orthographic projection of the charging pin,
- wherein in a plane where the manipulation device is located, an outer contour of the orthographic projections of the manipulation device and the charging pin has a minimum circumscribed circle, and a connecting line (X1) between an orthographic projection of the first sound pickup hole and a center of the minimum circumscribed circle forms an included angle $\alpha$ in a range of 100° to 140° with a connecting line (X2) between an orthographic projection of the second sound pickup hole and the center of the minimum circumscribed circle.

In some embodiments, the included angle $\alpha$ is in a range of 110° to 130°.

In some embodiments, a diameter d of the minimum circumscribed circle is 5 mm to 8 mm.

In some embodiments, a diameter d of the minimum circumscribed circle is 5 mm to 6 mm.

In some embodiments, in the plane where the manipulation device is located, the minimum circumscribed circle of the orthographic projection of the charging pin at least partially overlaps the manipulation device.

In some embodiments, in a plane perpendicular to the manipulation device, a difference between heights of orthographic projections of the first sound pickup hole and the second sound pickup hole in a direction perpendicular to the manipulation device is 0 to 2 mm.

In some embodiments, in a plane perpendicular to the manipulation device, a difference between heights of orthographic projections of the first sound pickup hole and the second sound pickup hole in a direction perpendicular to the manipulation device is 0.1 mm to 1.5 mm.

In some embodiments, the wireless listening device further comprises a magnet, wherein in the plane perpendicular to the manipulation device, orthographic projections of the first microphone, the second microphone and the magnet at least partially overlap.

In some embodiments, the wireless listening device comprises a mainboard, which comprises a planar section extending substantially parallel to the manipulation device, and the first microphone and the second microphone are both fixed in the planar section.

In some embodiments, the wireless listening device further comprises a housing and a top cover, which closes the housing at an end of the wireless listening device, wherein an outer contour of the housing is at least partially matched with shapes of an external acoustic meatus and an auricular concha cavity of the wearer.

In some embodiments, the top cover is formed with a protruding portion that comprises: a central bumped portion configured to accommodate the manipulation device and the charging device; a first lug portion configured to accommodate the first microphone; and a second lug portion configured to accommodate the second microphone.

In some embodiments, the wireless listening device further comprises an antenna arranged at an edge of a contour of the central bumped portion.

According to the present disclosure, by constructing the central bumped portion at the top cover of the wireless listening device and optimizing the arrangement of the charging device, the manipulation device, and the antenna in the accommodating groove formed by the central bumped portion, the structure of the wireless listening device is compact, so that the center of gravity of the wireless listening device can be closer to the acoustic meatus and the auricular concha cavity of the user, the support of the wireless listening device on the user's ear is optimized, and the wireless listening device is not easy to fall off and the wearing comfort is improved. Particularly by the design of the central bumped portion, the user can touch the manipulation device more conveniently, manipulate the wireless listening device more accurately, and reduce or even avoid the compression on the ear caused by any improper force application. In addition, the design of the central bumped portion is also beneficial to the antenna of the wireless listening device to transmit and receive signals. By optimizing the relative positions of the two microphones of the wireless listening device and their positions relative to the charging device and the manipulation device, the wireless listening device can have a compact and small structure, particularly at an end away from the acoustic meatus of the user, so that the user's wearing comfort is high and the wireless listening device is not easy to fall off. Meanwhile, the wireless listening device can also have a good call noise reduction function, and the user can well experience a call.

DETAILED DESCRIPTION OF THE EMBODIMENTS

Figure 1:
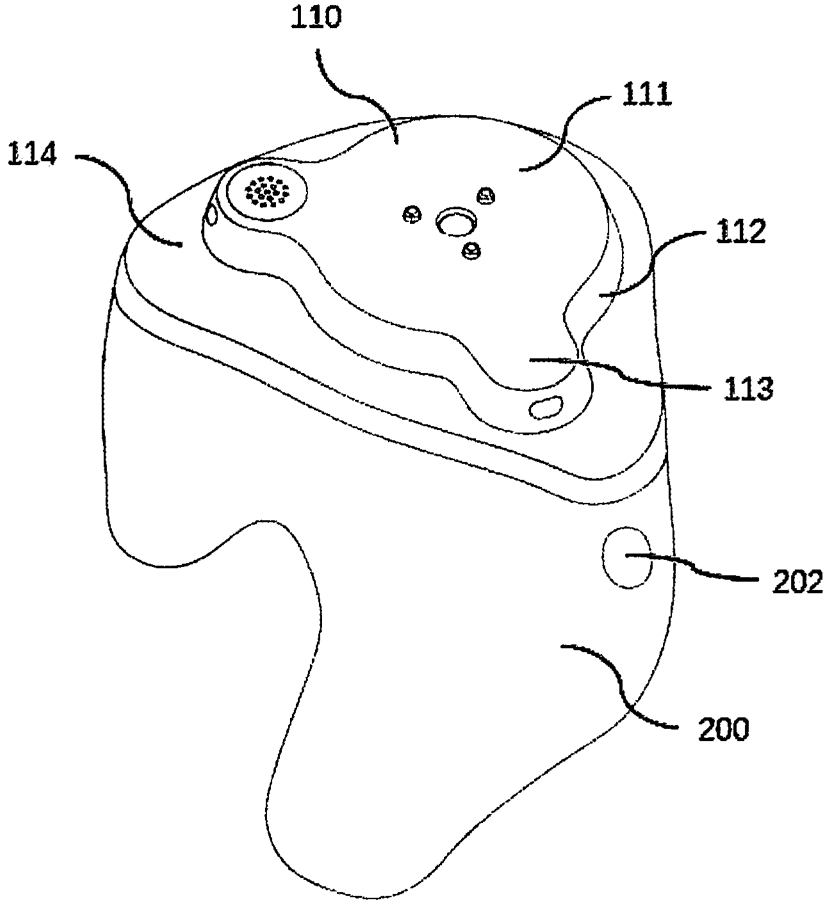
FIG. 1 shows a perspective view of a wireless listening device according to an embodiment of the present disclosure.

The specific embodiments of the present application are described below regarding the drawings. In the drawings, the same or similar reference numerals are used to denote the same or similar components, and the repeated descriptions thereof are omitted for simplicity.

FIG. 1 is a perspective view of a wireless listening device according to an embodiment of the present disclosure. In some embodiments, the wireless listening device is configured as a wireless earphone. In some embodiments, the wireless listening device is configured as a True Wireless Stereo (TWS) earphone. FIG. 1 only schematically shows a single body of the wireless listening device to be worn on a user's left ear. However, those skilled in the art will appreciate that the wireless listening device of this embodiment can include two single bodies used as a pair and worn on the user's left and right ears respectively, and they are substantially symmetrically configured in structure and are not connected to each other by traditional physical wires. Here, to simplify the description, only one single body in the wireless listening device is described with reference to the drawings.

Referring to FIG. 1, the wireless listening device according to this embodiment includes a housing 200 and a top cover 110.

In some embodiments, the top cover 110 and the housing 200 are connected to each other in a form-fitting manner such as snap-fit, and/or an interference fit manner, and/or by an adhesive, and/or by a separate connecting member.

In this embodiment, the housing 200 can penetrate an outer area of an external acoustic meatus of a wearer and can be supported at an auricular concha cavity. The housing 200 is configured with an accommodating cavity 201, referring to FIGS. 1 and 3, an opening of the accommodating cavity 201 is closed by a top cover 110, so that the housing 200 and the top cover 110 that are connected to each other jointly form an accommodating space for accommodating an acoustic module of the wireless listening device.

In some embodiments, the housing 200 can be customized according to the user's ear so that an outer contour of the housing 200 is partially matched with shapes of the external acoustic meatus and the auricular concha cavity of the user. In some embodiments, the housing 200 can penetrate the outer area of the external acoustic meatus of the wearer and can be supported at the auricular concha cavity and a cymba conchae. Thus, when the user wears the wireless listening device, the top cover 110 is located at an end of the wireless listening device away from the external acoustic meatus of the user. In some embodiments, the housing 200 is additionally matched with the cymba concha of the user or a part thereof. Thus, the wireless listening device is not easy to fall off and does not cause local compression on the user's ear, thereby improving the wearing comfort. In addition, since the customized housing 200 has a high degree of fitting with the external acoustic meatus and the auricular concha cavity of the user, the wireless listening device has a good sound insulation effect, and is not easily interfered by external environmental noise particularly in a scenario where the user is listening attentively, such as enjoying music or talking.

In some embodiments, in which the housing 200 is configured as a customized housing, a ventilation duct 202 can also be configured at the housing 200 to communicates the external acoustic meatus of the user with the outside. One end of the ventilation duct 202 of the wireless listening device may be located at an end of the housing 200 close to the external acoustic meatus, and the other end of the ventilation duct 202 may be formed at an end of the housing 200 away from the external acoustic meatus or at the top cover 110. When the user wears the wireless listening device, the air pressure between the acoustic meatus of the user and the outside may be balanced by the ventilation duct 202, thereby reducing or even avoiding the discomfort caused by the increase of the internal pressure of the acoustic meatus. In addition, particularly when the user wears the wireless listening device for a long time, since being in communication with the outside, the acoustic meatus of the user can also be kept dry to avoid bacterial breeding.

In some embodiments, the top cover 110 is made of a non-metallic material. In some embodiments, the cap 110 includes at least one of an ABS material, a PC material, a PET material, and ceramics. In some embodiments, the top cover 110 is made of an ABS material, a PC material, a PC/PET composite, an ABS/PC composite, or ceramics.

Figure 2:
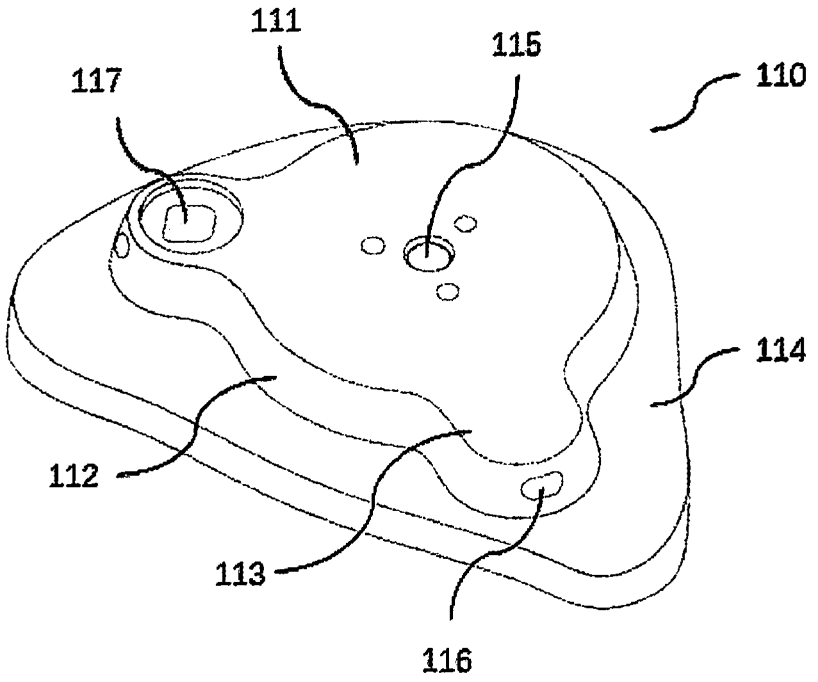
FIG. 2 shows a perspective view of a top cover of a wireless listening device according to an embodiment of the present disclosure.
Figure 3:
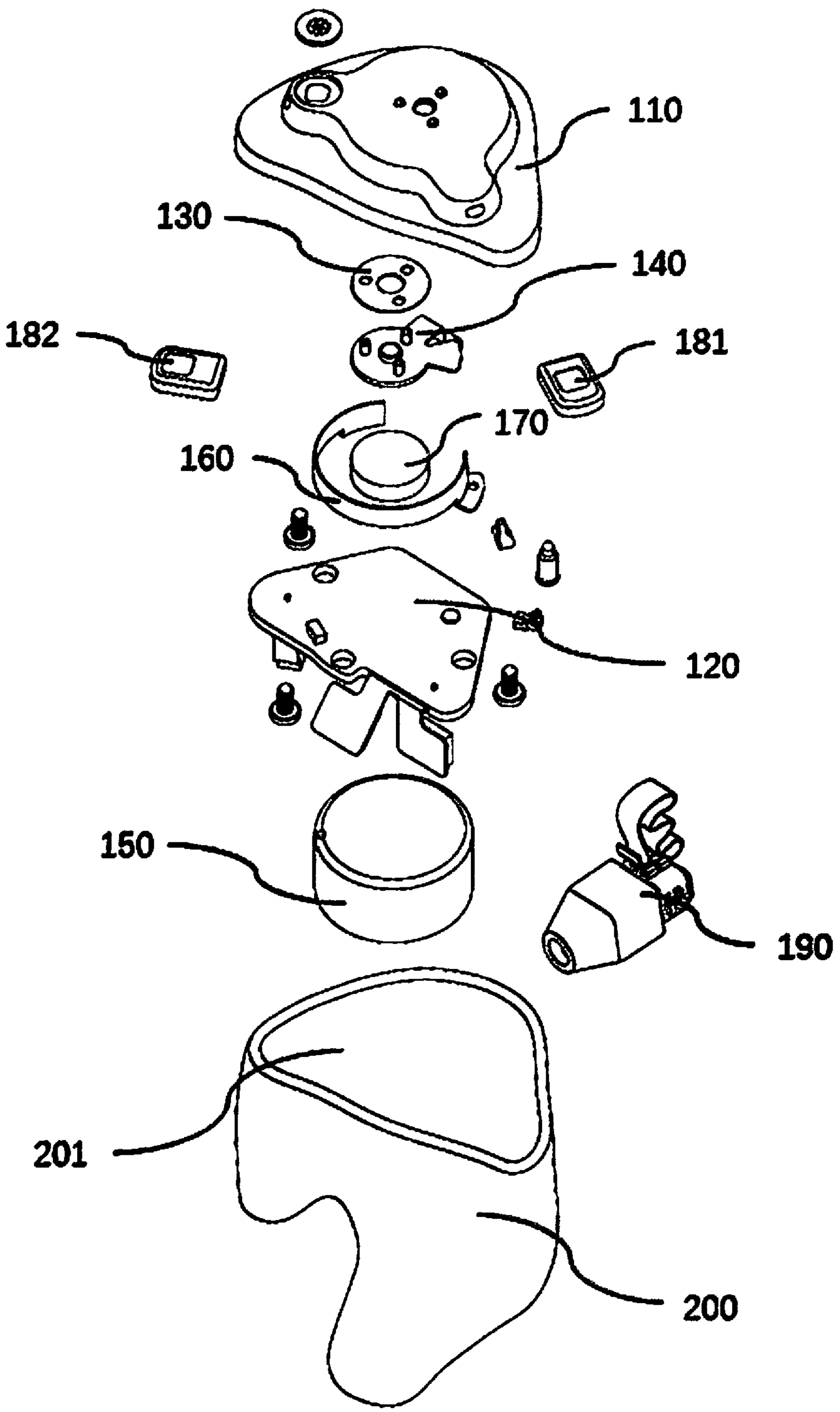
FIG. 3 shows an exploded view of a wireless listening device according to an embodiment of the present disclosure.

Referring to FIGS. 1 to 3, in this embodiment, the top cover 110 is configured with a central bumped portion, which includes a panel portion 111 and a raised portion 112.

The panel portion 111 extends substantially in a planar shape. In some embodiments, the panel portion 111 is configured as a plane at an inner surface facing the acoustic module, thereby facilitating the stable operation of a manipulation device described in detail below. In some embodiments, an outer surface of the panel portion 111 facing away from the acoustic module, i.e., an outer surface of the wireless listening device, is configured as a plane or with a slight curvature. In some embodiments, the outer surface of the panel portion 111 facing away from the acoustic module is configured as being smooth or textured. However, those skilled in the art will appreciate that the design of the outer surface of the panel portion 111 facing away from the acoustic module should be based on the premise of not affecting the user's operation on the manipulation device. In some embodiments, the panel portion is substantially circular, elliptical, or polygonal when being viewed in a direction perpendicular thereto, in other words, the panel portion 111 can extend substantially in a planar shape to be substantially circular, elliptical or polygonal.

The raised portion 112 is connected around an outer periphery of the panel portion 111 and at least partially extends toward the housing 200 in a direction perpendicular to a plane where the panel portion 111 is located. In some embodiments, the raised portion 112 can extend toward the housing 200 or the external acoustic meatus of the user in a direction perpendicular to an overall extending direction of the panel portion 111. In some embodiments, the raised portion 112 can extend toward the housing 200 or the external acoustic meatus of the user obliquely to the direction perpendicular to the overall extending direction of the panel portion 111. In some embodiments, in a cross-sectional view of the central bumped portion of the top cover 110 taken along a plane perpendicular to the overall extending direction of the panel portion 111, the raised portion 112 may extend toward the housing 200 or the external acoustic meatus of the user in a straight line, a folded line, and/or an arc.

In this embodiment, the panel portion 111 and the raised portion 112 form an accommodating groove opened toward an interior of the wireless listening device, and a charging device, a manipulation device, and an antenna (described in detail below) in the acoustic module of the wireless listening device are at least partially accommodated in the accommodating groove.

In some embodiments, referring to FIGS. 1 to 3, the top cover 110 is further configured with at least one lug portion 113 arranged at an outer periphery of the central bumped portion, wherein the lug portion 113 forms a groove opened toward the interior of the wireless listening device. Components in the acoustic module can be at least partially arranged in the groove. In some embodiments, the cap 110 is configured with one, two, three, or four lug portions 113. Particularly in a case where the top cover 110 is configured with at least two lug portions, the same type or different types of components in the acoustic module can be arranged in the grooves formed by different lug portions respectively. In some embodiments, the lug portions are arranged at the outer periphery of the central bumped portion at a certain interval relative to the central bumped portion, wherein particularly when being viewed from the exterior of the top cover 110, the lug portions 113 and the central bumped portion form separate protruding structures at the top cover 110, in which case the sides of the lug portions 113 are not continuous with the raised portions 112 of the central bumped portion. In some embodiments, for example, referring to FIG. 2, the lug portions 113 are formed at the outer periphery of the central bumped portion immediately adjacent to the central bumped portion, wherein particularly being viewed from the exterior of the top cover 110, the lug portions 113 and the central bumped portion jointly form an integral protruding structure at the top cover 110, where the sides of the lug portions 113 are connected to the raised portion 112 of the central bumped portion.

In some embodiments, referring to FIGS. 1 to 6, the top cover 110 is further configured with a joint portion 114, wherein the joint portion 114 is connected to an end of the raised portion 112 opposite to the panel portion 111 and at least partially extends toward the housing 200 in a plane parallel to the panel portion 111. In some embodiments, the joint portion 114 is configured as a substantially annular plate-shaped section, which forms a connecting portion from an edge of a protruding structure formed by the central bumped portion and a possibly existing lug portion close to the housing 200 to an edge of the opening of the accommodating cavity 201 of the housing 200. In some embodiments, the joint portion 114 is configured as an annular plate-shaped section parallel to the panel portion 111. In some embodiments, the joint portion 114 is configured as an annular plate-shaped section extending in a slightly conical shape. In some embodiments, the joint portion 114 is at least partially configured with an undulating structure.

Figure 4:
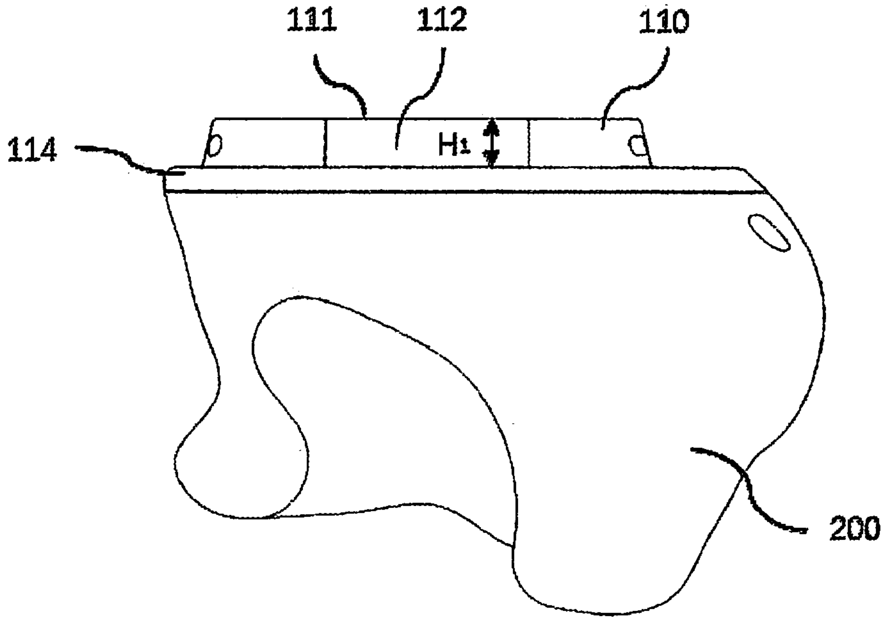
FIG. 4 shows a side view of a wireless listening device according to an embodiment of the present disclosure.

In some embodiments, referring to FIG. 4, in a direction perpendicular to the panel portion 111, a distance $H_1$ between the outer surface of the panel portion 111 and a connecting portion of the raised portion 112 and the joint portion 114 is 1 mm to 3 mm, such as 2 mm. In this case, the user's finger can be quickly and accurately positioned to the panel portion 111, which is beneficial to accurately applying a force on the manipulation device, and reducing or avoiding the possibility of improper manipulation, thereby reducing the compression on the user's ear and improving the manipulation sensitivity of the wireless listening device. Further, in the above size range of the distance $H_1$, it is also possible to design the material thickness of the panel portion according to the conventional material thickness of the top cover, for example, the thickness of the panel portion is in a range of 0.5 mm to 1 mm, so that an accommodating groove with a reasonable depth can be formed by the central raised portion.

Viewed from the exterior of the wireless listening device, in some embodiments, as shown in FIGS. 1 to 4, the lug portion 113 and the central bumped portion have substantially the same height in the direction perpendicular to the panel portion 111. But in some embodiments, the lug portion and the central bumped portion have different heights in the direction perpendicular to the panel portion 111, for example, a height of an end surface of the lug portion is lower than a height of the panel portion 111, i.e., the end surface of the lug portion 113 is closer to the housing 200 than the panel portion 111.

Viewed from the interior of the wireless listening device, in some embodiments, the accommodating groove formed by the central bumped portion and the accommodating groove formed by the lug portion have different depths. In some embodiments, the central bumped portion forms a deeper accommodating groove or recess than the lug portion. In some embodiments, the accommodating groove formed by the central bumped portion and the accommodating groove formed by the lug portion have the same depth.

In some embodiments, the cap 110 can be implemented as an integral member. In some embodiments, various sections of the top cover 110, such as the panel portion 111, the raised portion 112, the possibly existing lug portion 113, and the possibly existing joint portion 114, are integrally formed in a processing step of manufacturing the top cover 110, wherein an outer edge of the joint portion 114 can be trimmed by cutting.

Those skilled in the art will appreciate that rounded corners may be provided between adjacent sections among various sections of the top cover 110, such as the panel portion 111, the raised portion 112, the possibly existing lug portion 113, and the possibly existing joint portion 114, so that a smooth transition is achieved between the sections, thereby avoiding local stress concentration.

In this embodiment, referring to FIG. 3, the acoustic module of the wireless listening device can be accommodated in the accommodating space jointly formed by the housing 200 and the top cover 110. In this embodiment, the acoustic module of the wireless listening device includes a manipulation device 130, a charging device 140, a battery 150, an antenna 160, sound pickup devices 181 and 182, a speaker 190, and a mainboard 120 integrated with chips electrically connected to the above components.

In the wireless listening device of this embodiment, components such as the manipulation device 130, the charging device 140, the antenna 160, and the sound pickup devices 181 and 182 that need to be interacted or communicated with the outside are integrated on one side of the top cover 110 in the accommodating space jointly formed by the housing 200 and the top cover 110. In this case, the housing 200 of the wireless listening device can be configured as a housing customized according to the user's ear in some embodiments, so that a designer does not need to separately adjust positions of the components such as the manipulation device 130, the charging device 140, the antenna 160, and the sound pickup devices 181 and 182 for the customized housings of different users, thereby avoiding additional design costs.

Figure 5:
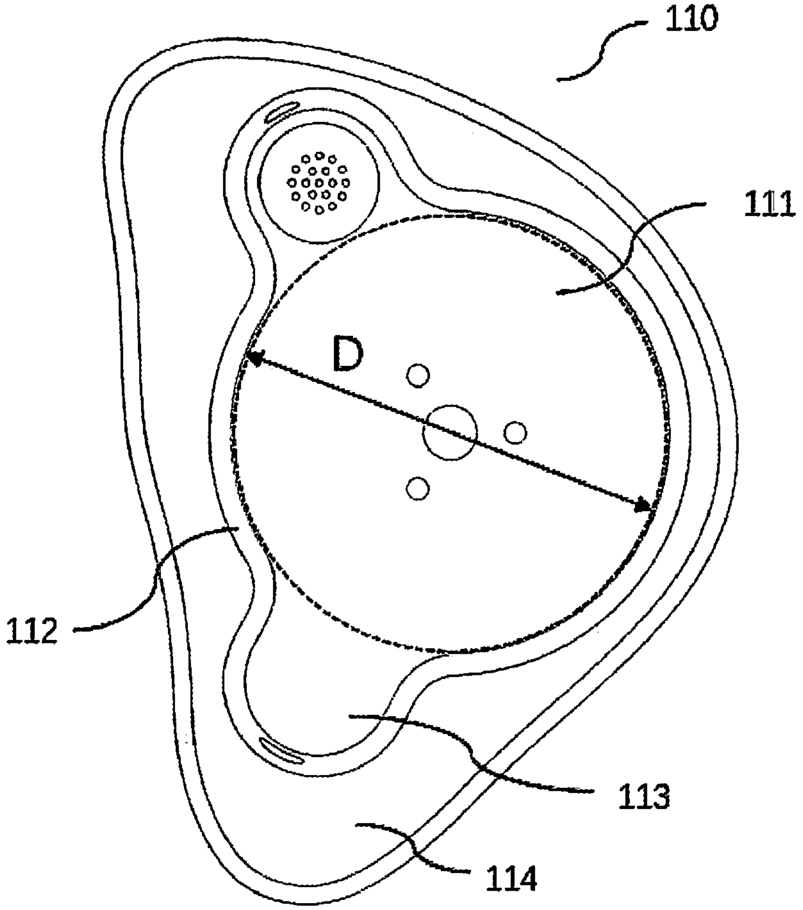
FIG. 5 shows a top view of a top cover of a wireless listening device according to an embodiment of the present disclosure.
Figure 6:
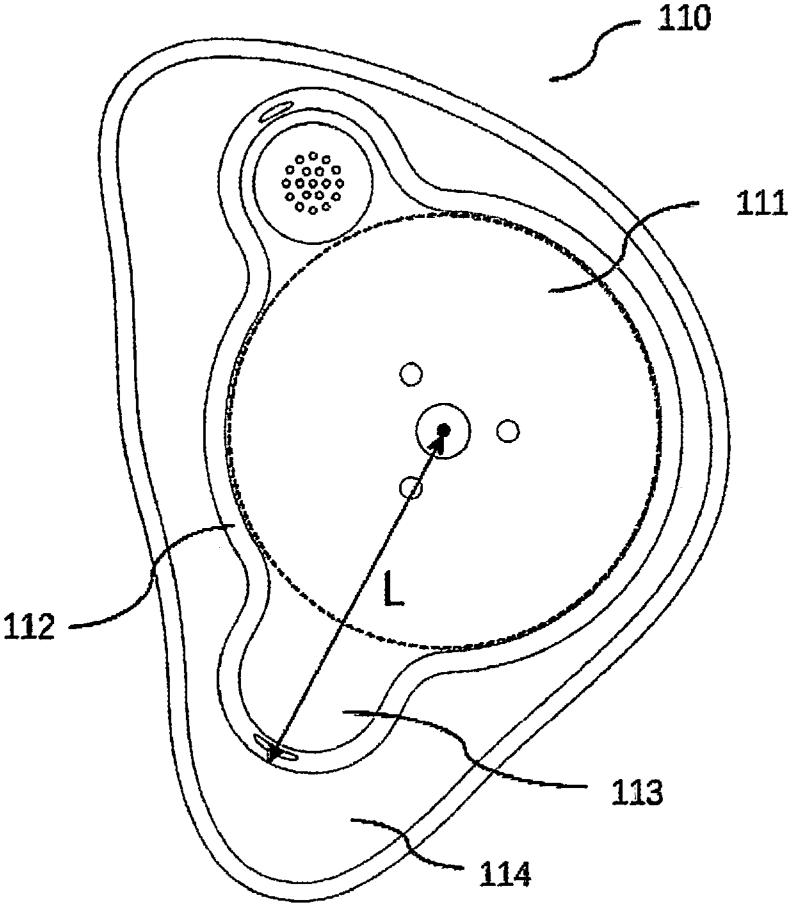
FIG. 6 shows a top view of a top cover of a wireless listening device according to an embodiment of the present disclosure.

In this embodiment, referring particularly to FIGS. 3 and 5, the manipulation device 130, the charging device 140, and the antenna 160 of the wireless listening device are at least partially accommodated in an accommodating groove formed by the central bumped portion and opened toward the acoustic module substantially in a direction perpendicular to the panel portion. Here, 'at least partially accommodated' particularly means that one or at least two of the manipulating device 130, the charging device 140, and the antenna 160 can extend beyond the accommodating groove in the direction perpendicular to the panel portion 111. Here, it can be understood that orthographic projections of the manipulation device 130, the charging device 140, and the antenna 160 on the plane where the panel portion 111 is located fall within the range of the panel portion 111. In the plane where the panel portion 111 is located, for example, in the plane where an inner surface of the panel portion 111 facing the acoustic module is located, a diameter D of a minimum circumscribed circle of the orthographic projections of the manipulation device 130, the charging device 140 and the antenna 160 as a whole is in a range of 8 mm to 16 mm. Here, the minimum circumscribed circle may be understood as a minimum circumscribed circle of an outer contour of a pattern jointly formed by the orthographic projections of the manipulation device 130, the charging device 140, and the antenna 160 in the projection plane. In other words, the minimum circumscribed circle refers to a minimum circle that can accommodate the outer contour of the pattern jointly formed by the orthographic projections of the manipulation device 130, the charging device 140, and the antenna 160 in the projection plane. Here, when the diameter D of the minimum circumscribed circle is less than or equal to 16 mm, the layout of the manipulation device 130, the charging device 140 and the antenna 160 at the top cover 110 is compact so that the top cover 110 with the central bumped portion can be adaptive to the ears of about 70% users, wherein 'adaptive' here particularly means that when the user wears the wireless listening device, the central bumped portion is substantially located in the auricular concha cavity or both the auricular concha cavity and the cymba conchae of the user, so that the support of the wireless listening device at the user's ear is optimized. When the diameter D of the minimum circumscribed circle is greater than or equal to 8 mm, the antenna 160 can be arranged on an outermost side of the acoustic module away from the external acoustic meatus under the conditions of providing a reasonable manipulation area of the manipulation device 130 and realizing the end-side arrangement of the charging device 140.

In some preferred embodiments, in the plane where the panel portion 111 is located, the diameter D of the minimum circumscribed circle of the orthographic projections of the manipulation device 130, the charging device 140 and the antenna 160 as a whole is in a range of 10 to 14 mm. Here, when the diameter D of the minimum circumscribed circle is less than or equal to 14 m, the layout of the manipulating device 130, the charging device 140 and the antenna 160 at the top cover 110 is compact so that the top cover 110 with the central bumped portion can be adaptive to the ears of about 80% users. When the diameter D of the minimum circumscribed circle is greater than or equal to 10 mm, the operation stability can be improved and the antenna 160 can be arranged on the outermost side of the acoustic module away from the external acoustic meatus under the conditions of providing a sufficient manipulation area of the manipulation device 130 and realizing the end-side arrangement of the charging device 140.

In some more preferred embodiments, in the plane where the panel portion 111 is located, the diameter D of the minimum circumscribed circle of the orthographic projections of the manipulation device 130, the charging device 140 and the antenna 160 as a whole is in a range of 11 mm to 13 mm. Here, when the diameter D of the minimum circumscribed circle is less than or equal to 13 mm, the layout of the manipulating device 130, the charging device 140 and the antenna 160 at the top cover 110 is compact so that the top cover 110 with the central bumped portion can be adaptive to the ears of about 90% users. When the diameter D of the minimum circumscribed circle is greater than or equal to 11 mm, the antenna 160 can be arranged on the outermost side of the acoustic module away from the external acoustic meatus under the conditions of ensuring a sufficient operation stability of the manipulation device 130 and the end-side arrangement of the charging device 140.

In some embodiments, the manipulation device 130 is configured as a touchpad, so that compared with a mechanical key switch, it can bring better experiences and sense of technology to the user, and reduce the discomfort caused by pressing the key forcibly. In some embodiments, the touchpad for example may be a device for implementing a touch control by changing a parameter such as a resistance or a capacitance of a touch unit on the touchpad by a human body part such as a finger, and it is different from a mechanical manipulation device such as a mechanical knob or a mechanical switch in that the touchpad usually does not generate a visible mechanical motion to manipulate the touchpad. In addition to the technology of changing the parameter such as the resistance or the capacitance, other touch technologies may also be used in some embodiments, as long as the touchpad can be manipulated from the exterior of the wireless listening device in the presence of the top cover 110, particularly the panel portion 111.

In some embodiments, referring to FIGS. 2 and 3, the charging device is shown as a charging pin 140. In this case, the panel portion 111 is configured with a through-hole 115 allowing the charging pin to extend through. Thus, the wireless listening device can be charged by an end of the charging pin exposed from the panel portion 111. In some embodiments, referring to FIG. 3, the charging pin 140 may be configured as a post with a circular cross-section. In some other embodiments, the charging pin may be configured as a post with a non-circular cross-section, wherein the cross-section of the post may be in various shapes such as a straight line segment, an arc segment, a folded line segment, and a curve segment. In some embodiments, referring to FIG. 3, the charging pin 140 extends in a straight line in its longitudinal direction. In some other embodiments, the charging pin can extend in an arc and/or folded line in its longitudinal direction. In some embodiments, the charging device includes at least one charging pin serving as a positive terminal and at least one charging pin serving as a negative terminal, wherein the charging pins may be identically or differently configured in shape and/or size. In some embodiments, referring to FIG. 3, the charging pin 140 is supported by a dedicated support member, such as a support plate, wherein the support member is capable of electrically connecting charging pins of the same polarity (e.g., positive or negative), thereby becoming part of a current path during charging. In some embodiments, the charging pin is supported by a mainboard with other functional components, such as the acoustic module, and enables an electrical connection to a charging pin of the same polarity. In some embodiments, the charging pin may be rigidly supported, e.g., fixedly mounted at the support member. In some embodiments, the charging pin may be resiliently supported, e.g., mounted in the form of a spring pin (also known as a POGO PIN) on the support member so that the contact is more stable when the charge pin is in contact with contacts of a charging stand. Here, it should be noted that the support member such as the aforementioned dedicated member, or any other functional member, does not define the shape or size of the orthographic projection of the charging device 140 herein. Thus, in an embodiment where the charging device is configured with a charging pin, for the charging device, only the charging pin is considered in the definition of the diameter D of the minimum circumscribed circle schematically shown in FIG. 5.

In some embodiments, in the plane perpendicular to the panel portion 111, orthographic projections of the touchpad 130 and the charging pin 140 partially overlap, thereby achieving a compact layout in a direction perpendicular to the panel portion. In some embodiments, in the plane where the panel portion 111 is located, the minimum circumscribed circle of the orthographic projection of the charging pin 140 at least partially overlaps the orthographic projection of the touchpad, thereby achieving a compact arrangement in a direction parallel to the panel portion. For example, referring to FIG. 3, the touchpad 130 is configured with a through-hole, and one or at least two of the charging pins can sequentially extend from the support member thereof through the through-hole of the touchpad 130 and the through-hole 115 of the panel portion 111. For another example, the touchpad is configured at its edge with a groove recessed toward a center of the touchpad, and one or at least two of the charging pins can sequentially extend from the support member thereof through the groove of the touchpad 130 and the through-hole 115 of the panel portion 111. In some other embodiments, the touchpad 130 is not additionally configured with a hollow structure, such as a through-hole or a groove, which allows the charging pin to pass through, the touchpad 130 has a shape such as a circle or an ellipse here, and one or at least two of the charging pins can extend from the support member, pass a lateral side of the touchpad, and then protrude into the through-hole of the panel portion 111.

In some embodiments, referring to FIG. 3, the antenna of the wireless listening device is arranged on a sidewall of the accommodating groove formed by the central bumped portion, thereby facilitating improving the capability of the antenna of the wireless listening device to transmit and receive signals. In some embodiments, the antenna is configured as a metal circuit formed on the sidewall of the accommodating groove. The antenna is formed on the sidewall of the accommodating groove for example by plastic hot melting, laser engraving, and the like. In some embodiments, referring to FIG. 3, the antenna 160 is configured as a metal sheet extending along the sidewall of the accommodating groove. Here, the antenna 160 for example is configured as a metal sheet extending in an arc shape. In some embodiments, the metal sheet forming the antenna for example can be supported on the mainboard 120 or at the top cover 110.

The wireless listening device further includes a sound pickup device. In some embodiments, referring to FIG. 3, the sound pickup device includes two microphones 181 and 182 arranged at the outer end of the wireless listening device. In some other embodiments, the sound pickup device includes other numbers of microphones arranged at the outer end of the wireless listening device.

In some embodiments, the microphones 181, 182 can be at least partially accommodated in the aforementioned groove formed by the lug portion 113. Here, microphone channels 116 and 117 for communicating sound pickup holes of the microphones with the exterior of the wireless listening device are formed at the top cover 110, particularly at the lug portion 113. In some embodiments, referring to FIG. 6, the positions of the microphones 181 and 182 can be set such that in the plane where the panel portion is located, a maximum distance L between an outer contour of an orthographic projection of the lug portion 130 and the center of the minimum circumscribed circle of the orthographic projections of the manipulation device 130, the charging device 140 and the antenna 160 as a whole is in a range of 8 mm to 12 mm. Therefore, the normal function of the antenna can be ensured under the condition that the components of the acoustic module are compactly arranged at the outer end of the wireless listening device.

The mainboard 120 is electrically connected to the manipulation device 130, the charging device 140, the battery 150, the antenna 160, the sound pickup device, and the speaker 190, and the mainboard 120 supports one or more of the above components. The electrical connection between the respective components may be implemented using a printed circuit, a lead, a flying wire, a spherical pin, and the like on the mainboard 120. A central processing unit (CPU) of the wireless listening device may be integrated at the mainboard 120. In some embodiments, referring to FIG. 3, the mainboard 120 is a rigid mainboard. Here, the rigid mainboard for example may be arranged between the manipulation device and the battery. In some embodiments, the mainboard is configured as a folded circuit board or a flexible circuit board.

In this embodiment, referring to FIG. 3, the battery 150 is arranged in the middle of an inner space of the wireless listening device. In the inner space of the wireless listening device, the speaker 190 is arranged close to the external acoustic meatus of the user. The battery and the speaker are not further defined in the present disclosure.

In some embodiments, referring to FIG. 3, the wireless listening device further optionally includes a magnet 170 to urge the wireless listening device into stable contact with the charging stand when the wireless listening device is charged.

Figure 7:
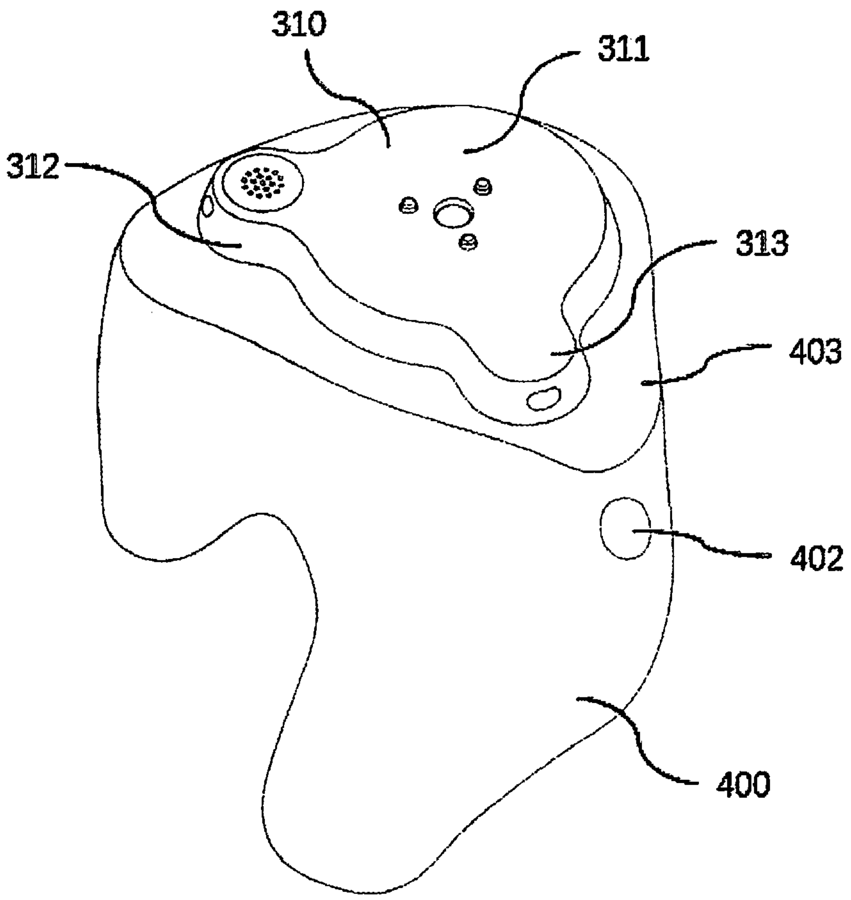
FIG. 7 shows a perspective view of a wireless listening device according to another embodiment of the present disclosure.
Figure 8:
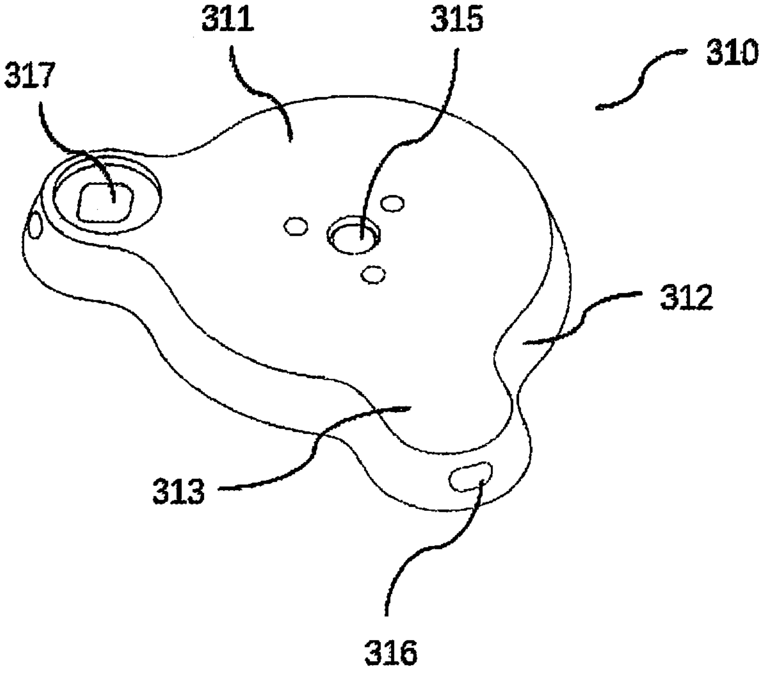
FIG. 8 shows a perspective view of a top cover of a wireless listening device according to another embodiment of the present disclosure.
Figure 9:
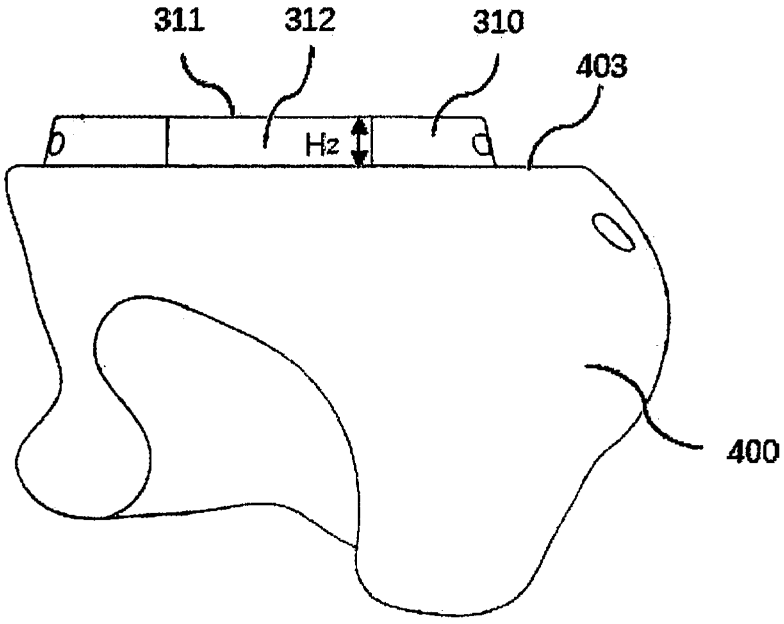
FIG. 9 shows a side view of a wireless listening device according to another embodiment of the present disclosure.

FIGS. 7 to 9 show another embodiment, which differs from the aforementioned embodiments in the configurations of the housing 400 and the top cover 310, and it will be appreciated that other configurations of the wireless listening device may refer to one or more of the aforementioned embodiments. In the embodiment shown in FIGS. 7 to 9, the housing 400 is configured with a contraction portion 403 formed at an edge of an accommodating cavity 401 of the housing 400. In this case, referring particularly to FIG. 8, the top cover 310 does not have the joint portion as described in the aforementioned embodiments. When the housing 400 is closed by the top cover 310, the contraction portion 403 at least partially extends toward the raised portion 312 of the top cover 310 in the plane parallel to the panel portion 311.

In some embodiments, referring to FIG. 9, in the direction perpendicular to the panel portion 311, a distance $H_2$ between the outer surface of the panel portion 311 and a connecting portion of the raised portion 312 and the contraction portion 114 is 1 mm to 3 mm. In this case, the user's finger can be quickly and accurately positioned to the panel portion 311, which is beneficial to accurately applying a force on the manipulation device, and reducing or even avoiding the possibility of improper manipulation, thereby reducing the compression on the user's ear and improving the manipulation sensitivity of the wireless listening device.

Figure 10:
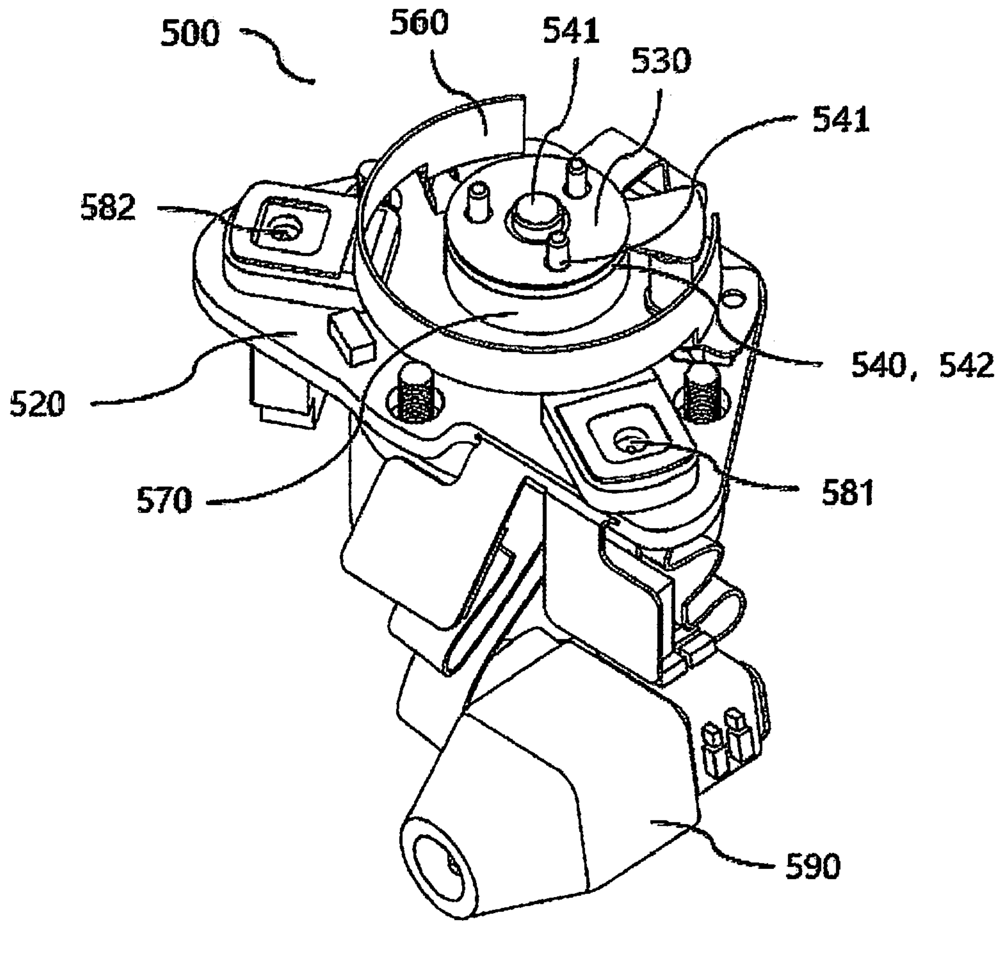
FIG. 10 shows a perspective view of an acoustic module of a wireless listening device according to an embodiment.

In some embodiments, referring to FIG. 10, the wireless listening device includes an acoustic module 500 for implementing multiple acoustic functions. The acoustic module 500 can be accommodated in an accommodating space formed by the housing assembly to be protected and supported.

In some embodiments, referring to FIG. 10, the acoustic module 500 of the wireless listening device includes a manipulation device 530, a charging device 540, a first microphone 581, a second microphone 582, an antenna 560, a battery (not shown), a speaker 590, and a mainboard 520 integrated with chips electrically connected to the above components. In these embodiments, components such as the manipulation device 530, the charging device 540, the first microphone 581, the second microphone 582, and the antenna 560, which need to be interacted or communicated with the outside (components located on the upper side according to the direction shown in FIG. 10), are arranged at an outer end of the wireless listening device, i.e., an end of the wireless listening device away from the acoustic meatus of the user when the user wears the wireless listening device.

In some embodiments, the mainboard 520 can support one or at least two of the components in the acoustic module 500. In some embodiments, referring to FIG. 10, the mainboard 520 is a rigid mainboard. In some embodiments, the mainboard is configured as a folded circuit board or a flexible circuit board. In some embodiments, a central processing unit (CPU) of the wireless listening device is integrated at the mainboard 520. In some embodiments, the mainboard 520 is electrically connected to the components in the acoustic module 500 by a printed circuit, a lead, a flying wire, a spherical pin, and the like.

The manipulation device 530 is substantially in a flat plate shape. In some embodiments, the manipulation device 530 has a planar section parallel to the mainboard 520. In some embodiments, referring to FIG. 10, the manipulation device 530 is configured as a touchpad, so that compared with a mechanical key switch, it can bring better experiences and a sense of technology to the user, and reduce the discomfort caused by pressing the key forcibly. In some embodiments, the touchpad for example may be a device for implementing a touch control by changing a parameter such as a resistance or a capacitance of a touch unit on the touchpad by a human body part such as a finger, and it is different from a mechanical manipulation device such as a mechanical knob or a mechanical switch in that the touchpad usually does not generate a visible mechanical motion to manipulate the touchpad. In addition to the technology of changing the parameter such as the resistance or the capacitance, other touch technologies may also be used in some embodiments, as long as the touchpad can be manipulated from the exterior of the wireless listening device in the presence of the housing assembly, particularly the top cover.

The charging device 540 includes a charging pin 541, which can penetrate out of the housing assembly of the wireless listening device, to charge the wireless listening device through an end of the charging pin 541 exposed from the outer surface of the housing assembly. In a case where the wireless listening device has a top cover, the end of the charging pin 541 exposed from the outer surface of the housing assembly may be higher than, flush with, or slightly lower than an upper surface of the top cover, where the upper surface of the top cover refers to a surface of the top cover facing away from the acoustic module 500. In some embodiments, referring to FIG. 10, the charging pin 541 may be configured as a post with a circular cross-section. In some other embodiments, the charging pin may be configured as a post with a non-circular cross-section, wherein the cross-section of the post may be in various shapes such as a straight line segment, an arc segment, a folded line segment, and a curved segment. In some embodiments, referring to FIG. 10, the charging pin 541 extends in a straight line in its longitudinal direction, i.e., a direction perpendicular to the manipulation device 530 here. In some other embodiments, the charging pin can extend in an arc and/or folded line in its longitudinal direction. In some embodiments, the charging device includes at least one charging pin serving as a positive terminal and at least one charging pin serving as a negative terminal, wherein the charging pins may be identically or differently configured in shape and/or size. In some embodiments, referring to FIG. 10, the charging pin 541 is supported by a dedicated support member 542, such as a support plate, wherein the support member 542 is capable of electrically connecting charging pins of the same polarity (e.g., positive or negative), thereby becoming part of a current path during charging. In some embodiments, the charging pin is supported by a mainboard with other functional components, such as the acoustic module, and enables an electrical connection to a charging pin of the same polarity. In some embodiments, referring to FIG. 10, the charging pin 541 may be rigidly supported, e.g., fixedly mounted on the support member 542. In some embodiments, the charging pin may be resiliently supported, e.g., mounted in the form of a spring pin (also known as a POGO PIN) on the support member so that the contact is more stable when the charge pin is in contact with contacts of a charging stand.

In a plane perpendicular to the manipulation device 530, orthographic projections of the manipulation device 530 and the charging pin 541 partially overlap, thereby achieving a compact layout in a direction perpendicular to the manipulation device 530. In some embodiments, in the plane where the manipulation device 530 is located, a minimum circumscribed circle of a pattern composed of the orthographic projections of all the charging pins 541 at least partially overlaps the manipulation device 530, thereby achieving a compact arrangement in a direction parallel to the manipulation device 530. Here, the minimum circumscribed circle may be understood as a minimum circle that can accommodate the outer contour of the pattern jointly formed by the orthographic projections of all the charging pins 541 in the projection plane, i.e., in the plane where the manipulation device 530 is located. It should be noted that, since the charging pin has a three-dimensional structure, the minimum circumscribed circle accommodates the complete planar shape of the orthographic projection of each of the charging pins, rather than passing through a center of the planar shape of the orthographic projection of the charging pin. Here, in the plane where the manipulation device 530 is located, the minimum circumscribed circle of the orthographic projections of all the charging pins 541 can partially or completely overlap the manipulation device 530; the minimum circumscribed circle of the orthographic projections of all the charging pins 541 can fall within the range of the manipulation device 530; or the manipulation device 530 falls within the range of the minimum circumscribed circle of the orthographic projections of all the charging pins 541.

Here, in some embodiments, referring to FIG. 10, the touchpad 530 is configured with a through-hole, and one or at least two of the charging pins 541 can extend from the support member thereof through the through-hole of the touchpad 530. In some embodiments, the touchpad is configured at its edge with a groove recessed toward a center of the touchpad, and one or at least two of the charging pins can extend from the support member thereof through the groove of the touchpad. In some other embodiments, the touchpad 530 is not additionally configured with a hollow structure such as a through-hole or a groove, which allows the charging pin to pass through, the touchpad 530 here has a shape such as a circle or an ellipse, and one or at least two of the charging pins can extend from the support member and pass a lateral side of the touchpad.

Figure 11:
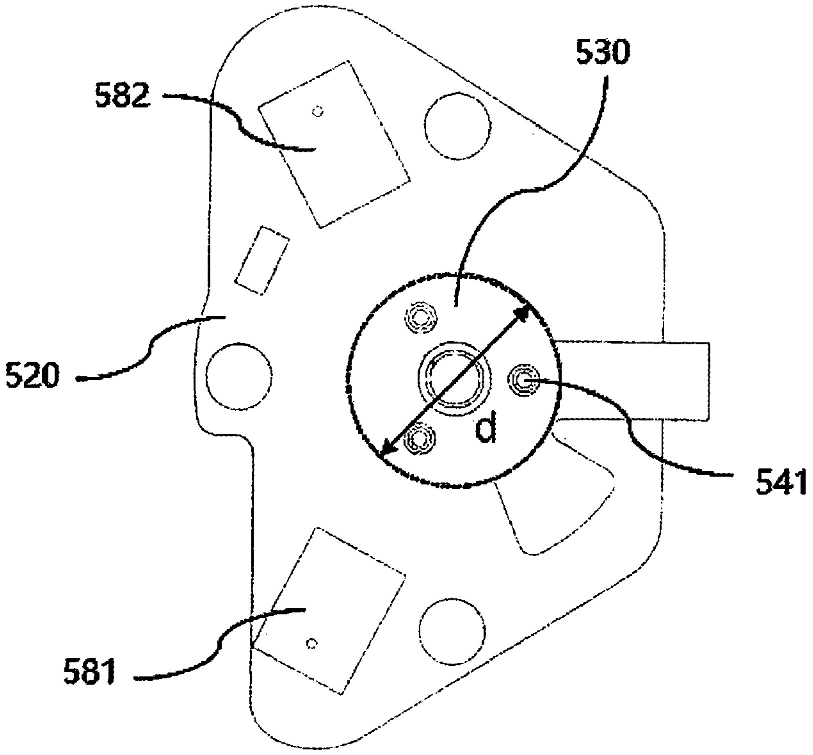
FIG. 11 shows a perspective view of a housing assembly of a wireless listening device according to an embodiment.

In some embodiments, referring to FIG. 11, the shapes and sizes of the manipulation device and the charging device are designed such that in the plane where the manipulation device 530 is located, a diameter d of the minimum circumscribed circle of the outer contour of the orthographic projections of the manipulation device 530 and the charging pin 541 is 5 mm to 8 mm. In some preferred embodiments, in the plane where the manipulation device 530 is located, the diameter d of the minimum circumscribed circle of the outer contour of the orthographic projections of the manipulation device 530 and the charging pins 541 is 5 mm to 6 mm. Here, the minimum circumscribed circle may be understood as a minimum circumscribed circle of an outer contour of a pattern jointly formed by the outer contour of the manipulation device 530 and the orthographic projections of the charging pins 541 in the projection plane. In other words, the minimum circumscribed circle refers to a minimum circle that can accommodate the outer contour of the pattern jointly formed by the orthographic projections of the manipulation device 530 and all the charging pins 541 in the projection plane. With the above designs of the manipulation device and the charging device, the arrangement of the components such as the first microphone 581, the second microphone 582, and the antenna 560, which will be described in detail below, can be provided with an accommodating space under the conditions of providing a sufficient manipulation area for the manipulation device 530 and realizing the end-side arrangement of the charging device 540, so that the wireless listening device can have a compact and small structure particularly at an end away from the acoustic meatus of the user, and thus the support of the wireless listening device at the user's ear is optimized, the user's wearing comfort is high, and the wireless listening device is not easy to fall off.

Figure 13:
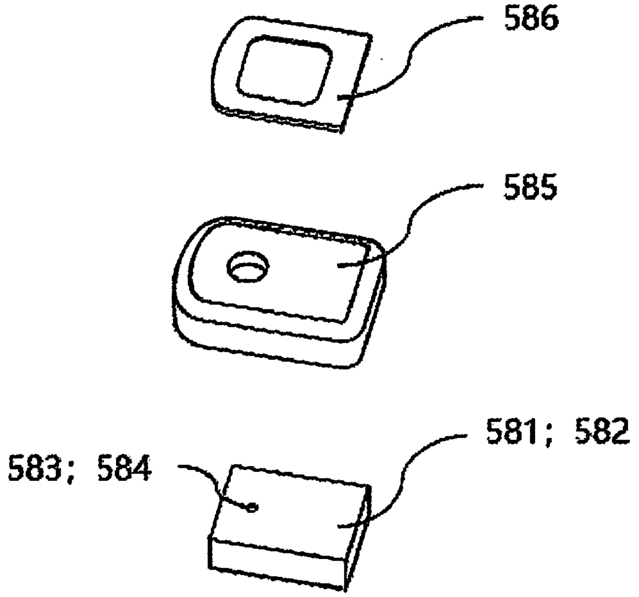
FIG. 13 shows a top view of an acoustic module of a wireless listening device according to an embodiment.

In some embodiments, referring to FIG. 10, the first microphone 581 and the second microphone 582 of the wireless listening device are both fixed at the planar section of the mainboard 520. In some embodiments, referring to FIGS. 10 and 13, the first microphone 581 and the second microphone 582 are respectively mounted in the acoustic module 500 in the form of microphone assemblies. Here, a first microphone assembly includes a first microphone 581, a hood 585, and a mesh 586, and the second microphone assembly includes a first microphone 582, a hood 585, and a mesh 586. In this case, the first microphone 581 and the second microphone 582 can be protected by the hoods 585. In addition, a sound pickup hole of the first microphone 581, referred to herein as a first sound pickup hole 583, and a sound pickup hole of the second microphone 582, referred to herein as a second sound pickup hole 584, are both covered by the mesh 586. In some embodiments, the first microphone 581 and the second microphone 582 may be substantially identically configured. In some other embodiments, the first microphone 581 and the second microphone 582 may also be differently configured.

In some embodiments, in the plane perpendicular to the manipulation device 530, a difference between heights of orthographic projections of the first sound pickup hole 583 and the second sound pickup hole 584 in the direction perpendicular to the manipulation device 530 is 0 to 2 mm, for example, 0.1 mm to 1.5 mm. Here, the orthographic projection of the first sound pickup hole 583 in the plane perpendicular to the manipulation device 530 may be understood as an orthographic projection of a geometric center of an entrance plane of the first sound pickup hole 583 in the plane perpendicular to the manipulation device 530, wherein the geometric center of the entrance plane of the first sound pickup hole 583 is a geometric center of a cross-section of the first sound pickup hole 583 in the entrance plane, and the entrance plane is an outer surface of the first microphone 581 opened with the first sound pickup hole 583. Here, correspondingly, the orthographic projection of the second sound pickup hole 584 in the plane perpendicular to the manipulation device 530 may be understood as an orthographic projection of a geometric center of an entrance plane of the second sound pickup hole 584 in the plane perpendicular to the manipulation device 530, wherein the geometric center of the entrance plane of the second sound pickup hole 584 is a geometric center of a cross-section of the second sound pickup hole 584 in the entrance plane, and the entrance plane is an outer surface of the second microphone 582 opened with the second sound pickup hole 584. Here, the opening orientations of the first sound pickup hole 583 and the second sound pickup hole 584 are not limited, wherein the first sound pickup hole 583 and the second sound pickup hole 584 may be opened toward the same direction or different directions. The layout of the two microphones 581 and 582 facilitates the compact arrangement of the components in the acoustic module 500 on the outer end of the wireless listening device.

Figure 12:
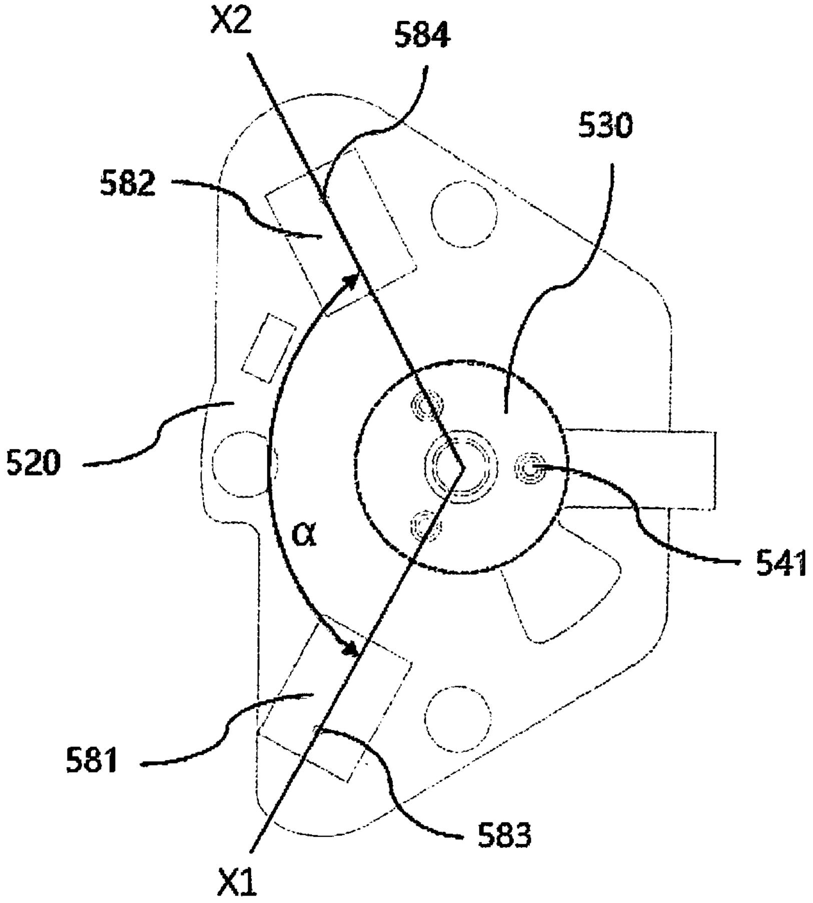
FIG. 12 shows a perspective view of a microphone assembly of a wireless listening device according to an embodiment.

Referring to FIG. 12, in the plane where the manipulation device 530 is located, an outer contour of the orthographic projections of the manipulation device 530 and the charging pin 541 has a minimum circumscribed circle, and a connecting line X1 between an orthographic projection of the first sound pickup hole 583 and a center of the minimum circumscribed circle forms an included angle $\alpha$ in a range of 500° to 540° with a connecting line X2 between an orthographic projection of the second sound pickup hole 584 and the center of the minimum circumscribed circle. In other words, in the plane where the manipulation device 530 is located, the orthographic projection of the first sound pickup hole 583 is connected to the center of the minimum circumscribed circle to form the first connection line X1, the orthographic projection of the second sound pickup hole 584 is connected to the center of the minimum circumscribed circle to form the second connection line X2, and the included angle between the first connection line X1 and the second connection line X2 is in a range of 100° to 140°. In some more preferred embodiments, the included angle α is in a range of 110° to 130°. Here, the orthographic projection of the first sound pickup hole 583 in the plane where the manipulation device 530 is located may be understood as an orthographic projection of a geometric center of an entrance plane of the first sound pickup hole 583 in the plane where the manipulation device 530 is located, wherein the geometric center of the entrance plane of the first sound pickup hole 583 is a geometric center of a cross-section of the first sound pickup hole 583 in the entrance plane, and the entrance plane is an outer surface of the first microphone 581 opened with the first sound pickup hole 583. Here, correspondingly, the orthographic projection of the second sound pickup hole 584 in the plane where the manipulation device 530 is located may be understood as an orthographic projection of a geometric center of an entrance plane of the second sound pickup hole 584 in the plane where the manipulation device 530 is located, wherein the geometric center of the entrance plane of the second sound pickup hole 584 is a geometric center of a cross-section of the second sound pickup hole 584 in the entrance plane, and the entrance plane is an outer surface of the second microphone 582 opened with the second sound pickup hole 584. Here, the opening orientations of the first sound pickup hole 583 and the second sound pickup hole 584 are not limited, wherein the first sound pickup hole 583 and the second sound pickup hole 584 may be opened toward the same direction or different directions. With the above designs of the relative positions of the two microphones 581 and 582 with respect to the charging device 540 and the manipulation device 530, the wireless listening device on the one hand can have a compact and small structure at an end thereof away from the acoustic meatus of the user. Particularly in a case where the outer end of the wireless listening device needs to be accommodated in the auricular concha cavity of the user, the wireless listening device with a small structure can be adaptive to ear structures of more users. On the other hand, the wireless listening device designed in this way can provide a sufficient distance between the first microphone 581 and the second microphone 582, so that the wireless listening device can have a good call noise reduction function, and the user can well experience a call.

In some embodiments, referring to FIG. 10, the antenna 560 of the wireless listening device can be arranged on a radial outer side of the minimum circumscribed circle of the outer contour of the orthographic projections of the manipulation device 530 and the charging pins 541, thereby facilitating improving the capability of the antenna 560 to transmit and receive signals without being interfered by other components in the acoustic module 500. In some embodiments, referring to FIG. 10, the antenna 560 is configured as a metal sheet extending in an arc shape. In some embodiments, the metal sheet forming the antenna for example can be supported on the mainboard 520 or a member constituting the housing assembly, such as the top cover 700. In some embodiments, the antenna is configured as a metal circuit formed at a component in the housing assembly, for example on an inner surface of the top cover 700. Here, the antenna is formed on the inner surface of the housing assembly for example by plastic hot melting, laser engraving, and the like.

In some embodiments, referring to FIG. 10, the battery (shielded in FIG. 10) of the wireless listening device may be arranged on a side of the mainboard 520 facing the external acoustic meatus of the user, so as not to occupy the limited space of the outer end of the wireless listening device.

In some embodiments, referring to FIG. 10, the wireless listening device further optionally includes a magnet 570 to urge the wireless listening device into stable contact with the charging stand when the wireless listening device is charged. In the plane perpendicular to the manipulation device 530, orthographic projections of the first microphone 581, the second microphone 582, and the magnet 570 at least partially overlap, thereby facilitating a compact arrangement of the wireless listening device, particularly at an end thereof away from the acoustic meatus of the user, and ensuring the capability of the antenna 560 to transmit and receive signals.

In some embodiments, referring to FIG. 10, the speaker 590 is arranged close to the external acoustic meatus of the user. The speaker 590 for example is a moving iron horn or a moving coil horn, and it is not further limited in the present disclosure.

In some embodiments, a third microphone may be disposed beside a sound hole of the speaker 590, so that the wireless listening device can improve the noise reduction capability of the wireless listening device using the three microphones. In some embodiments, the first microphone 581 can serve as a call microphone for picking up a voice signal in a call noise reduction technology such as an Environmental Noise Cancellation (ENC) technology, the second microphone 482 can serve as a noise reduction microphone for picking up a voice signal and a noise signal in the call noise reduction technology such as the ENC technology and serve as a feedforward microphone for example in a hybrid Active Noise Cancellation (ANC) technology, and the third microphone can serve as a feedback microphone for example in the hybrid ANC technology, so that the wireless listening device can realize the ENC technology and the ANC technology using the three microphones, and the noise reduction capability of the wireless listening device can be improved as a whole.

Figure 14:
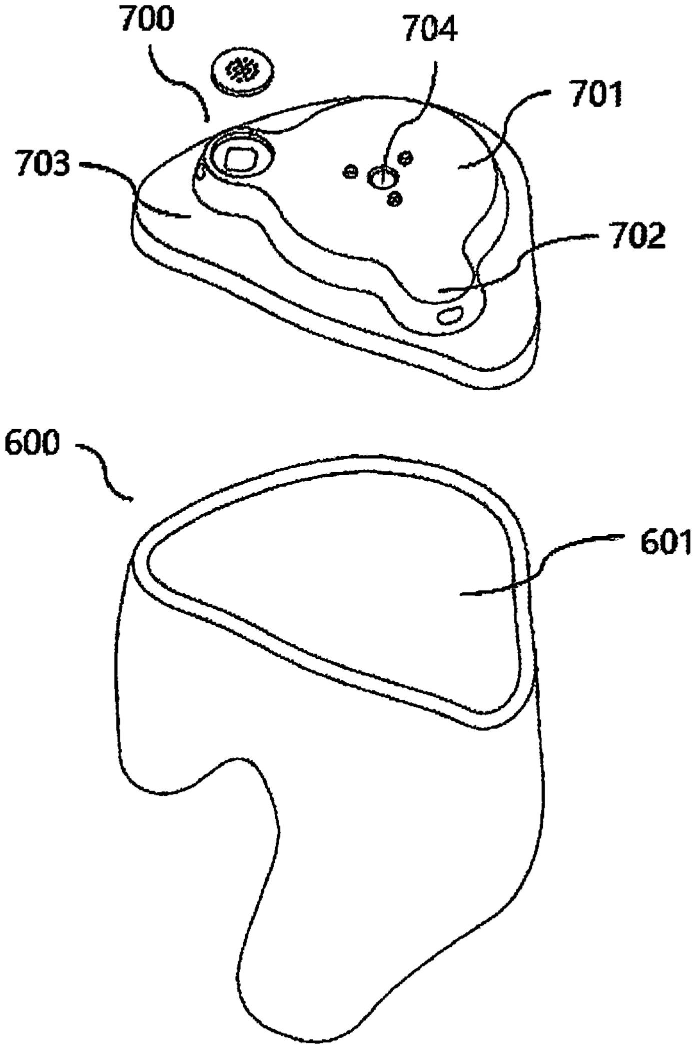
FIG. 14 shows a top view of an acoustic module of a wireless listening device according to an embodiment.

In some embodiments, referring to FIG. 14, the housing assembly of the wireless listening device includes a housing 600, and a top cover 700 that closes an accommodating cavity 601 of the housing 600 at an end of the wireless listening device. Therefore, the housing 600 and the top cover 700 connected to each other jointly form an accommodating space for accommodating the acoustic module 500 of the wireless listening device. In some embodiments, the top cover 700 and the housing 600 are connected to each other in a form-fitting manner such as snap-fit, and/or an interference fit manner, and/or by an adhesive, and/or by a separate connecting member.

In some embodiments, the housing 600 can be customized according to the user's ear so that an outer contour of the housing 600 is partially matched with the shapes of the external acoustic meatus and the auricular concha cavity of the user. In some embodiments, the housing 600 can penetrate into the outer area of the external acoustic meatus of the wearer and can be supported at the auricular concha cavity and a cymba conchae. In some embodiments, the housing 600 is additionally matched with the cymba concha of the user or a part thereof. Thus, the wireless listening device is not easy to fall off and does not cause local compression on the user's ear, thereby improving the wearing comfort. In addition, since the customized housing 600 has a high degree of fitting with the external acoustic meatus and the auricular concha cavity of the user, the wireless listening device has a good sound insulation effect, and is not easily interfered by external environmental noise particularly in a scenario where the user is listening attentively, such as enjoying music or talking, thereby achieving a good passive noise reduction effect. In this case, the wireless listening device has both passive and active noise reduction functions.

In some embodiments, referring to FIG. 14, the top cover 700 is formed with a protruding portion, which includes a central bumped portion 701 and two lug portions 702, i.e., a first lug portion and a second lug portion. Here, an accommodating groove formed by the central bumped portion 701 can accommodate the manipulation device 530 and the charging device 540; an accommodating cavity formed by the first lug portion can accommodate the first microphone 581, and an accommodating cavity formed by the second lug portion can accommodate the second microphone 582.

It will be appreciated that a through-hole 704 allowing the charging pin 541 of the charging device 540 to extend through is configured at the top cover 700, particularly at the central bumped portion 701, so that the wireless listening device can be charged using the end of the charging pin exposed from the top cover 700. In addition, a microphone channel for communicating the sound pickup hole of the corresponding microphone with the exterior of the wireless listening device is configured at the top cover 700, particularly at the lug portion 702. In some embodiments, the antenna 560 of the acoustic module 500 is arranged at an edge of a contour of the central bumped portion 701.

The above embodiments of the present disclosure are merely examples for clearly explaining the present disclosure, rather than limitations to the embodiments of the present disclosure. For those skilled in the art, other different forms of changes or modifications can be made based on the above descriptions. It is unnecessary and also impossible to exhaust all the embodiments here. Any modification, equivalent substitution, or improvement made within the spirit and principle of the present disclosure should fall within the protection scope of the claims of the present disclosure. In addition, the terms 'first', 'second', and the like are only used for descriptive purposes and cannot be construed as indicating or implying any relative importance.

The present disclosure relates to a wireless listening device, comprising: a housing, which is placeable at an external auditory canal and an auricular concha cavity of a wearer, and a top cover, which closes the housing at an end of the wireless listening device and is configured with a central bumped portion that comprises: a panel portion, which extends substantially in a planar shape, and a raised portion, which is connected around an outer periphery of the panel portion and at least partially extends toward the housing in a direction perpendicular to a plane where the panel portion is located, wherein the panel portion and the raised portion form an accommodating groove opened toward an interior of the wireless listening device, and a charging device, a manipulation device and an antenna of the wireless listening device are at least partially accommodated in the accommodating groove, wherein in the plane where the panel portion is located, a diameter of a minimum circumscribed circle of orthographic projections of the charging device, the manipulation device and the antenna as a whole is in a range of 8 to 16 mm.

LIST OF THE REFERENCE NUMERALS

110: top cover
111: panel portion
112: raised portion
113: lug portion
114: joint portion
115: through-hole
116: microphone channel
117: microphone channel
120: mainboard
130: manipulation device
140: charging device
150: battery
170: magnet
181: microphone
182: microphone
190: speaker
200: housing
201: accommodating cavity
202: ventilation duct
310: top cover
311: panel portion
312: raised portion
313: lug portion
315: through-hole
316: microphone channel
317: microphone channel
400: housing
402: ventilation duct
403: contraction portion
500: acoustic module
520: mainboard
530: manipulation device
540: charging device
541: charging pin
542: support member
560: antenna
570: magnet
581: first microphone
582: second microphone
583: first sound pickup hole
584: second sound pickup hole
585: hood
586: mesh
600: customized housing
601: inner cavity
700: top cover
701: central bumped portion
702: lug portion
704: through-hole

The invention claimed is:

1. A wireless listening device, comprising:

a housing, which is placeable at an external auditory canal and an auricular concha cavity of a wearer, and a top cover, which closes the housing at an end of the wireless listening device and is configured with a central bumped portion that comprises:

a panel portion, which extends substantially in a planar shape, and a raised portion, which is connected around an outer periphery of the panel portion and at least partially extends toward the housing in a direction perpendicular to a plane where the panel portion is located, wherein the panel portion and the raised portion form an accommodating groove opened toward an interior of the wireless listening device, and a charging device, a manipulation device and an antenna of the wireless listening device are at least partially accommodated in the accommodating groove, wherein in the plane where the panel portion is located, a diameter D of a minimum circumscribed circle of orthographic projections of the charging device, the manipulation device, and the antenna as a whole is in a range of 8 mm to 16 mm.

2. The wireless listening device according to claim 1, wherein in the plane where the panel portion is located, the diameter D of the minimum circumscribed circle of the orthographic projections of the charging device, the manipulation device and the antenna as a whole is in a range of 11 mm to 13 mm.

3. The wireless listening device according to claim 1, wherein the panel portion is substantially circular, elliptical, or polygonal.

4. The wireless listening device according to claim 1, wherein the top cover further comprises at least one lug portion, which is arranged at an outer periphery of the central bumped portion and forms a groove opened toward the interior of the wireless listening device.

5. The wireless listening device according to claim 4, wherein in the plane where the panel portion is located, a maximum distance L between an outer contour of an orthographic projection of the lug portion and a center of the minimum circumscribed circle is in a range of 8 mm to 12 mm.

6. The wireless listening device according to claim 1, further comprising:

a first microphone comprising a first sound pickup hole; and a second microphone comprising a second sound pickup hole, wherein the manipulation device is substantially in a flat plate shape, and the charging device comprises a charging pin, wherein in a plane perpendicular to the manipulation device, an orthographic projection of the manipulation device partially overlaps an orthographic projection of the charging pin, wherein in a plane where the manipulation device is located, an outer contour of the orthographic projections of the manipulation device and the charging pin has a minimum circumscribed circle, and a connecting line between an orthographic projection of the first sound pickup hole and a center of the minimum circumscribed circle forms an included angle $\alpha$ in a range of 100° to 140° with a connecting line between an orthographic projection of the second sound pickup hole and the center of the minimum circumscribed circle.

7. The wireless listening device according to claim 6, wherein a diameter d of the minimum circumscribed circle of the outer contour of the orthographic projections of the manipulation device and the charging pin is 5 mm to 6 mm.

8. The wireless listening device according to claim 6, wherein in the plane where the manipulation device is located, the minimum circumscribed circle of the orthographic projection of the charging pin at least partially overlaps the manipulation device.

9. The wireless listening device according to claim 6, further comprising a magnet, wherein in the plane perpendicular to the manipulation device, orthographic projections of the first microphone, the second microphone, and the magnet at least partially overlap.

10. The wireless listening device according to claim 6, further comprising a mainboard which comprises a planar section extending substantially parallel to the manipulation device, and the first microphone and the second microphone are both fixed in the planar section.

11. The wireless listening device according to claim 1, wherein the antenna is configured as a metal circuit formed on a sidewall of the accommodating groove or configured as a metal sheet extending along the sidewall of the accommodating groove.

12. The wireless listening device according to claim 1, wherein the cover plate is further configured with a joint portion, which is connected to an end of the raised portion opposite to the panel portion and at least partially extends toward the housing in a plane parallel to the panel portion.

13. The wireless listening device according to claim 1, wherein the housing is configured with a contraction portion, which is formed at an edge of an accommodating cavity of the housing and at least partially extends toward the raised portion in a plane parallel to the panel portion.

14. The wireless listening device according to claim 1, wherein the housing is a housing customized according to an ear of the wearer, and wherein an outer contour of the housing is at least partially matched with shapes of an external acoustic meatus and an auricular concha cavity of the wearer.

15. The wireless listening device according to claim 14, wherein the wireless listening device is configured with a ventilation duct for communicating the external acoustic meatus of the wearer with the outside.

* * * * *